Aug. 20, 1957
E. D. SMITH
2,803,316
BRAKE LOCKING MEANS
Filed Oct. 21, 1954
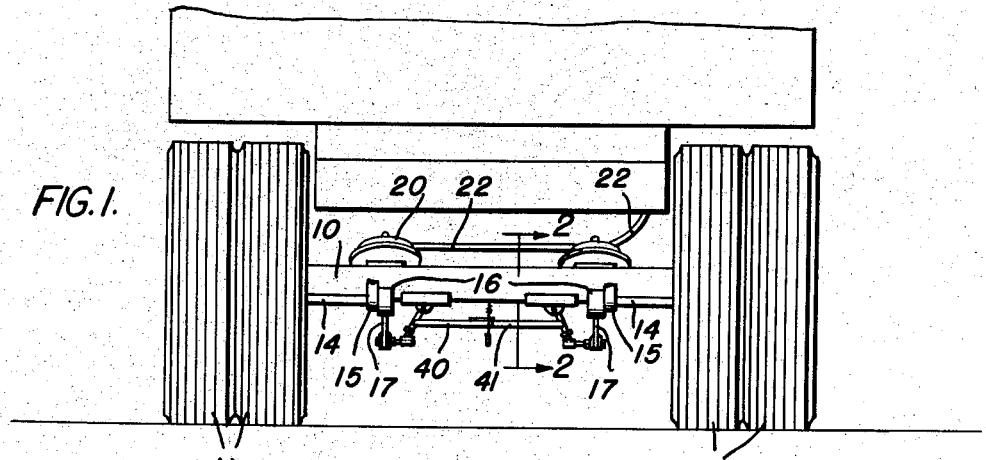
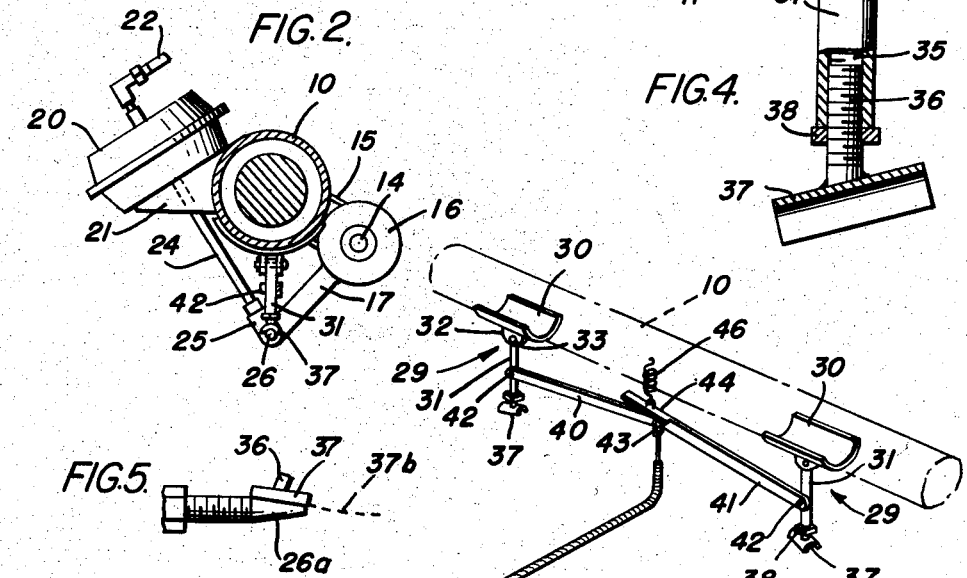
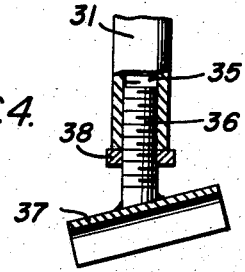
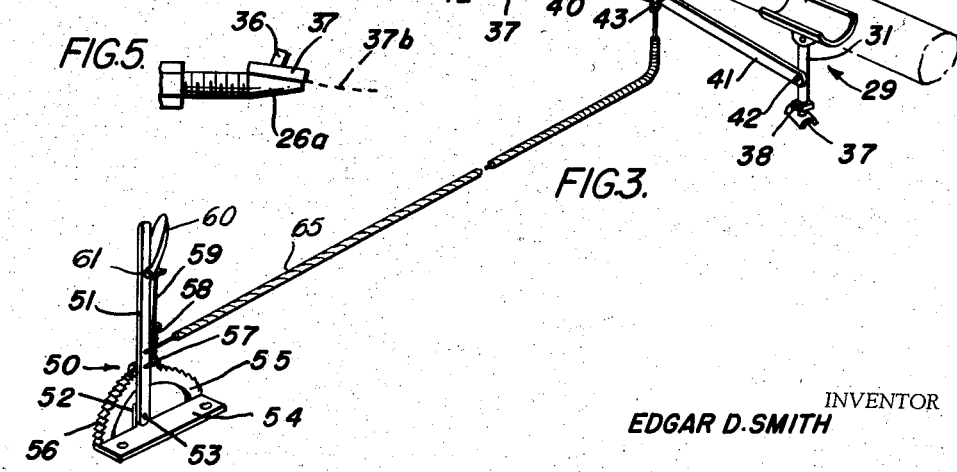
INVENTOR
EDGAR D. SMITH
BY
ATTORNEY United States Patent Office 2,803,316
Patented Aug. 20, 1957

2,803,316

BRAKE LOCKING MEANS

Edgar D. Smith, Duarte, Calif.

Application October 21, 1954, Serial No. 463,758

4 Claims. (Cl. 188—265)

This invention relates generally to brake mechanisms for vehicles and the like and relates more particularly to brake locking means.

While the invention has particular utility in connection with brake mechanisms for truck trailers, and is shown and described in such connection, it is to be understood that its utility is not confined thereto.

It has been found that the brakes on truck trailers and the like sometimes fail to hold after being set and the vehicle has been left standing. Should a valve of the air brake system fail to function properly so that there is a leak, or a leak occurs in the system from any other cause, the air pressure will drop and the brakes release. Serious accidents have been known to occur because of such failure and it is an object of the present invention to provide means which will prevent the brakes from releasing even upon failure of the air in the system to maintain proper holding of the brakes.

It is another object of the invention to provide means of this character that is an effective safety device which will hold the brakes tight when desired.

A further object of the invention is to provide means of this character that will positively lock the brakes in the applied position so they will not release until the operator desires to release them.

A still further object of the invention is to provide means of this character that may be selectively positioned in the operating and inoperative positions.

Another object of the invention is to provide means of this character that is simple in construction and operation.

Still another object of the invention is to provide means of this character that is sturdy, effective and reliable.

The characteristics and advantages of the invention are further sufficiently referred to in connection with the following detailed description of the accompanying drawings which represent one embodiment. After considering this example, skilled persons will understand that many variations may be made without departing from the principles disclosed; and it is contemplated the employment of any structures, arrangements or modes of operation that are properly within the scope of the appended claims.

In the drawings:

Fig. 1 is a view of a portion of the rear end of a vehicle showing mechanism embodying the present invention installed on the rear axle housing.

Fig. 2 is a sectional view taken on line 2—2 of Fig. 1;

Fig. 3 is a diagrammatic perspective view of the mechanism with one type of means for actuating same;

Fig. 4 is a fragmentary view, partially in section, of one of the locking levers with an adjustable saddle; and Fig. 5 is an enlarged view of one of the saddle engaging pins.

Referring more particularly to Fig. 1 there is shown the rear end of a truck trailer having an axle housing 10 and two sets of rear wheels 11 disposed at the respective ends of said housing. The brakes for the rear wheels are not shown but are of the usual well known type actuated by shafts 14. There is a shaft 14 for the brakes of each set of wheels and each shaft is rotatably mounted by means which includes an ear 15 secured in any well known manner to the housing 10. The shafts 14 have their adjacent ends spaced longitudinally of the axle housing 10 and said adjacent ends of said shafts extend inwardly of the respective ears and have collars 16 secured thereto. The collars are provided with brake actuating arms 17 which may be formed integrally of said collars. Shafts 14 are axially aligned with each other and the arms 17 are arranged in a common plane which is radial of the axis of said shafts.

Means for actuating the arms 17 comprises a pneumatic actuator 20 for each arm, each actuator being secured to the housing 10 by means of a bracket 21 of well known character and secured in the well known manner. Each actuator has a pneumatic connection 22 with the usual source of air pressure or other actuating fluid under pressure. The actuators are located at the generally axially opposite end of the housing 10, as best shown in Figs. 1 and 2, and each actuator is connected with the arm 17 it is adapted to actuate by means of a rod 24. The outer end of each rod is provided with a clevis 25 between the arms of which the outer free end of arm 17 is received. The outer end of arm 17 being provided with a transverse opening which is aligned with openings in the arms of the clevis for reception of a pivot pin 26 to thereby provide a pivotal connection between the rod 24 and arm 17.

The above described mechanism is known and operates in the well known manner, the actuator 20 actuating the levers 17 between a position whereat the brakes are off, that is, not applied, and the braking or applied positions. The free ends of arms 17 move arcuately a limited distance.

The means for locking the brakes in the applied position comprises a locking device, indicated generally at 29, for the brakes of each side. There is a plate or base 30, Figs. 1, 2 and 3, for each locking device, said plate being of any suitable shape but is shown as being arcuate so as to conform to the rounded contour of the housing 10 to which it is secured by any suitable means such as, for example, welding. There is a locking lever 31 for each device 29, said levers having one end pivoted between a pair of ears 32 on the respective plates 30 by means of suitable pivot pins 33. Ears 32 may be formed integrally of the plates or otherwise.

Each lever 31 is provided with a tapped bore 35 extending longitudinally from the free end for reception of the externally threaded stem 36 of a saddle 37 which is concavely arcuate in cross section and which is inclined at an angle relative to the axis of the stem 36. The saddle may be thereby adjusted toward and away from the free end of the lever 31 and may be secured in selected adjusted positions by means of a lock nut 38, as best shown in Fig. 4.

Locking devices 29 are spaced apart longitudinally on the housing 10 and each is positioned adjacent the respective arm 17, with the arms 31 arranged to pivot so that the free ends thereof will move toward and away from the adjacent free ends of the said arms 17.

Means is provided for effecting simultaneous actuation of the levers 31, said means comprising a pair of elongated members 40 and 41 which may be termed links. Each of these members has one end pivotally secured to a lever 31 by means of respective pivot pins 42 located intermediate the ends of said levers 31. The opposite end of member 40 is pivotally secured to member 41 by means of a pivot pin 43, the point of connection of member 40 to member 41 being spaced longitudinally from the inner or adjacent end of said member 41 so that the adjacent end portions overlap, the member 41 having a flange 44 turned laterally so as to be engageable by the adjacent end portion of the member 40 when the members 40 and 41 are in a predetermined aligned position relative to each other.

A spring 46 has one end secured to a suitable anchor on the housing 10 and the opposite end secured to one of the members 40, 41. As shown the spring 46 is connected to the member 41 adjacent the free end thereof and breaks the alignment of said members so as to pull the free ends of the levers 31 inwardly toward each other.

Actuation of the members 40, 41 to the aligned position is effected by any suitable means. As shown, in Fig. 3, a manually actuated lever mechanism, indicated generally at 50, is provided. There is a lever 51 pivoted adjacent the lower end to an upstanding ear 52 by means of a pivot pin 53. Ear 52 is upturned from a securing plate 54 adapted to be secured to any convenient fixed part of the truck or trailer. There is an arcuate ratchet 55 having teeth 56 engageable by a pawl 57 operably mounted on lever 51 and urged into the teeth engaging position by a spring 58 on a rod 59 which extends upwardly adjacent the side of the lever 51. The upper end of rod 59 is operably connected to a release member 60 pivoted to the handle 51 by a pivot pin 61, said member 60 being adapted to be gripped by the fingers of the operator in the usual well known manner to move the pawl 57 out of engagement with the teeth 56. This lever arrangement is, of course, of well known type.

A flexible cable 65 is shown as the connecting means between lever 51 and the members 40, 41 into aligned position. One end of said cable 65 is secured to lever 51 intermediate the ends thereof and the opposite end of said cable is connected to the pivot 43 for the members 40, 41. A flexible sheath 66 is provided for said cable to protect it.

It is to be understood that other means may be used to connect lever 51 with the members 40, 41 and there may be such a connection therebetween that the members 40, 41 may be actuated in both directions by said lever 51.

When the brakes are set by the actuators 20, the rods 31 are moved downwardly to rotate the lever 17 counter clockwise to the position shown in Fig. 2 so that the pivot pins 26 are positioned in the path of movement of the saddles. Then actuation of lever 51 to move the members into aligned position causes the saddles 37 to swing over the adjacent free ends of the pivot pins 26 and into snug engagement with said pin ends. It is to be noted that the pins 26 have the free ends 26a thereof extending toward each other and that said free ends are tapered. The taper of the ends 26a is on the arc of the path 37b of the saddles thereby permitting said saddles to swing into position on said pin ends and to snugly engage said ends to prevent release of the brakes should the pressure in the brake system drop.

The flange 44 limits the movement of the members 40, 41 in the brake locking direction so as to properly place the arms 31 and the ratchet and pawl mechanism holds the members 40, 41 in the locking position.

Movement of lever 51 in the opposite direction permits spring 46 to break the alignment of members 40, 41 and move said members sufficiently to swing the saddles off the pins 26 so that the brakes may be released, the arms 17 then moving in the clockwise direction. It may be necessary to apply pressure to the actuators 20 before releasing the locking means should the air pressure in said actuators be lost while the vehicle is standing.

While manually operable means is shown for actuating the locking means, it is to be understood that suitable automatic means may also be used.

I claim:

1. In a vehicle brake system wherein the vehicle is provided with a rear axle housing to which brake actuating shafts are operably secured at each end of said housing and in alignment with each other in longitudinally spaced relationship: a brake actuating lever for each shaft, a pneumatic actuator for each lever; and a pivot pin connecting each actuator to the respective brake actuating lever adjacent the free end thereof, each pin having a tapered free end extending toward the longitudinal center of the housing, said lever being movable by said actuators from a brake released position to a braking position; means for locking said levers in the braking position, said means comprising a plate secured to said housing adjacent each brake actuating lever; a locking lever pivoted to each plate and adapted to be pivotally moved so as to swing the free end toward and away from the free end of said brake actuating lever, each locking lever having a tapped bore extending longitudinally from the free end thereof; a saddle, concave in cross section; a threaded stem on said saddle threadably received in said bore for adjusting the position of said saddle; a lock nut on said stem for engagement with the free end of said locking lever to secure said saddle in adjusted position; an actuating member for each locking lever, each member having one end pivoted to its respective locking lever; means pivotally connecting one end of one member to the other member in spaced relation longitudinally of the adjacent end of said other member to form a pivoted joint; manually operable means for moving said members into substantial alignment with each other to thereby move the saddles onto the tapered ends of said pivot pins when the brake actuating levers are in braking position, said saddles being in the path of return movement of the tapered pins to thereby prevent release of said brakes, the taper of said pins being substantially along the arcuate path of movement of said saddles; means limiting said movement of said members; and yielding means for bending said joint and moving said members out of said aligned position to retract said locking levers.

2. In a vehicle brake system wherein the vehicle is provided with a rear axle housing to which brake actuating shafts are operably secured at each end of said housing and in alignment with each other in longitudinally spaced relationship: a brake actuating lever for each shaft, an actuator for each lever; and a pivot pin connecting each actuator to the respective brake actuating lever adjacent the free end thereof, each pin having a tapered free end extending toward the longitudinal center of the housing, said levers being movable by said actuators from a brake released position to a braking position; means for locking said levers in the braking position, said means comprising a plate secured to said housing adjacent each brake actuating lever; a locking lever pivoted to each plate and adapted to be pivotally moved so as to swing the free end toward and away from the free end of said brake actuating lever; a saddle, concave, in cross section, secured to the free end of each locking lever; an actuating member for each locking lever, each actuating member having one end pivoted to its respective locking lever; means pivotally connecting the inner ends of said members together to form a pivotal joint; manually operable means for moving said members into substantial alignment with each other to thereby move the saddles onto the tapered ends of sai dpivot pins when the brake actuating levers are in braking position, said saddles being in the path of return movement of the tapered pins to thereby prevent release of said brakes; means limiting said movement of said members; and yielding means for breaking said joint and moving said members out of said aligned position.

3. In a vehicle brake system wherein the vehicle is provided with an axle housing to which brake actuating shafts are operably secured and spaced apart: a brake actuating lever for each shaft, an actuator for each lever, and a pivot pin connecting each actuator to the respective brake actuating lever adjacent the free end thereof, each pin having a tapered free end extending toward the longitudinal center of the housing, said levers being movable by said actuators from a brake released position to a braking position; means for locking said levers in the braking position, said means comprising a plate secured to said housing adjacent each brake actuating lever; a locking lever pivoted to each plate and adapted to be pivotally moved so as to swing the free end thereof toward and away from the free end portion of said brake actuating lever; a pin engaging part at the free end of each locking lever; means interconnecting said locking levers for simultaneous movement; manually operable means for said interconnecting means to thereby move the pin engaging parts into engagement with said pivot pins when the brake actuating levers are in braking position, said parts being in the path of return movement of the tapered pins thereby preventing release of said brakes; and means for breaking said joint and moving said members out of said aligned position.

4. In a vehicle brake system wherein the vehicle is provided with an axle housing to which brake actuating shafts are operably secured in spaced relationship to each other: a brake actuating lever for each shaft, an actuator for each lever, and a pivot pin connecting each actuator to the respective brake actuating lever, each pin having a free end portion, said levers being movable by said actuators from a brake released position to a braking position; means for locking said levers in the braking position, said means comprising a base plate secured to said housing adjacent each brake actuating lever; a locking lever pivoted to each plate and adapted to be pivotally moved so as to swing the free end thereof toward and away from said brake actuating lever; a pin engaging part adjacent the free end of each locking lever; means interconnecting said locking levers for simultaneous movement together; manually operable means for said interconnecting means to thereby move the pin engaging parts into engagement with said pivot pins when the brake actuating levers are in braking position, said parts being in the path of return movement of the free ends of said pins to thereby prevent release of said brakes; and means for moving the interconnecting means so as to retract said brake locking levers.

References Cited in the file of this patent
UNITED STATES PATENTS

| | | |
|---|---|---|
| 1,412,272 | Creveling | Apr. 11, 1922 |
| 2,533,338 | Weingarten | Dec. 12, 1950 |
| 2,579,616 | Sahlgaard | Dec. 25, 1951 |
| 2,600,758 | Gross | June 17, 1952 |
| 2,645,313 | Schaadt | July 14, 1953 |